United States Patent [19]

Mueller

[11] 4,447,932
[45] May 15, 1984

[54] CASTER INCLUDING ON CENTER BEARING ARRANGEMENT

[75] Inventor: Ralph W. Mueller, Waukesha, Wis.

[73] Assignee: E. R. Wagner Mfg. Co., Hustisford, Wis.

[21] Appl. No.: 341,839

[22] Filed: Jan. 22, 1982

[51] Int. Cl.³ ............................................. B60B 33/00
[52] U.S. Cl. .................... 16/21; 16/DIG. 27; 308/221
[58] Field of Search .............. 16/20, 21, 22, 26, 27, 16/DIG. 27; 308/6 C, 221, 225, 233

[56] References Cited

U.S. PATENT DOCUMENTS

| | | |
|---|---|---|
| 349,982 | 9/1886 | Conklin . |
| 438,422 | 10/1890 | Pederson . |
| 454,742 | 6/1901 | Jordan . |
| 494,925 | 4/1893 | Leinwather . |
| 851,396 | 4/1907 | Bode . |
| 919,873 | 4/1909 | Jennings . |
| 1,589,104 | 6/1926 | Bull . |
| 1,645,831 | 10/1927 | Tiedemann . |
| 1,797,830 | 3/1931 | Koehler . |
| 1,882,497 | 10/1932 | Jarvis .................................... 16/21 |
| 1,914,204 | 6/1933 | Herold et al. ............. 16/DIG. 27 X |
| 2,478,035 | 8/1949 | Babcock . |
| 2,516,486 | 7/1950 | Schlicksupp . |
| 2,681,836 | 6/1954 | Jarund . |
| 2,688,149 | 9/1954 | Popp . |
| 2,971,211 | 2/1961 | Kramcsak, Jr. ...................... 16/21 |
| 2,998,286 | 8/1961 | Jarund . |
| 3,263,266 | 8/1966 | Rabelos et al. . |
| 3,381,330 | 5/1968 | Aninger . |
| 4,095,854 | 6/1978 | Teramachi ...................... 308/6 C |
| 4,097,954 | 7/1978 | Christensen .................. 16/35 D X |

FOREIGN PATENT DOCUMENTS

244914 9/1960 Australia ........................... 308/6 C

*Primary Examiner*—Fred Silverberg

[57] ABSTRACT

A caster includes a support plate and a yoke adapted to support the support plate, the yoke being pivotably joined to the support plate for rotation about a generally vertical axis. An axle is support by the legs of the yoke and at least one wheel is rotatably supported on the axle. A first ball bearing assembly is provided including a bearing race surrounding the axis of rotation of the yoke and a plurality of balls housed in the race. A second ball bearing assembly is spaced from the first ball bearing assembly and is positioned above the axle, the second ball bearing assembly being adapted to transfer a substantial majority of the weight applied on the support plate to the caster wheel.

5 Claims, 3 Drawing Figures

CASTER INCLUDING ON CENTER BEARING ARRANGEMENT

FIELD OF THE INVENTION

The invention relates to casters and more particularly to casters which include ball bearing assemblies.

BACKGROUND PRIOR ART

Examples of prior art casters which include ball bearing assemblies are illustrated in the Rabelos et al. U.S. Pat. No. 3,263,266, issued Aug. 2, 1966; the Aninger U.S. Pat. No. 3,381,330, issued May 7, 1968; the Babcock U.S. Pat. No. 2,478,035, issued Aug. 2, 1949; the Bode U.S. Pat. No. 851,396, issued Apr. 23, 1907; and the Jennings U.S. Pat. No. 919,873, issued Apr. 27, 1909.

Attention is also directed to the Bull U.S. Pat. No. 1,589,104, issued June 15, 1926; the Leinwather U.S. Pat. No. 494,925, issued Apr. 4, 1893; the Pederson U.S. Pat. No. 438,422, issued Oct. 14, 1890; the Jordan U.S. Pat. No. 454,742, issued June 23, 1891; and the Conklin U.S. Pat. No. 349,982, issued Sept. 28, 1886.

Attention is further directed to the Popp U.S. Pat. No. 2,688,149, issued Sept. 7, 1954; the Schlicksupp U.S. Pat. No. 2,516,486, issued July 25, 1950; the Teidemann U.S. Pat. No. 1,645,831, issued Oct. 18, 1927; the Koehler U.S. Pat. No. 1,797,830, issued Mar. 24, 1931; the Jarund U.S. Pat. No. 2,998,286, issued Aug. 29, 1961; and the Jarund U.S. Pat. No. 2,681,836, issued June 22, 1954.

SUMMARY OF THE INVENTION

The present invention provides an improved caster including a support plate having a lower surface, a yoke adapted to support the support plate and including a pair of spaced apart downwardly extending legs, the legs including upper ends and lower ends having aligned bores. A plate member joins the upper ends of the legs and is in closely adjacent generally parallel spaced relation with respect to the lower surface of the support plate, the plate member being pivotably joined to the support plate for free rotation about a generally vertical axis. An axle is supported in the aligned bores, and at least one wheel is rotatably supported by the axle. A first ball bearing assembly surrounds the pivot axis of the yoke and includes a bearing race formed in either the lower surface of the support plate or the plate member and a plurality of balls housed in the race. A second ball bearing assembly is spaced from the first ball bearing assembly and is positioned above the axle.

One of the features of the invention is that a substantial majority of the weight on the support plate is transferred to the wheel by the second ball bearing assembly.

In a preferred embodiment of the invention the second bearing assembly includes a first race portion defined by the plate member and supporting balls against the lower surface of the support plate and a second return race portion wherein the balls do not contact the lower surface of the support plate.

In a preferred form of the invention the first race portion defines an arc having a radius which is defined by the distance between the generally vertical axis and the first race portion.

Various other features and advantages of the invention will be apparent by reference to the following description of a preferred embodiment, to the claims, and to the drawings.

Figure 1:
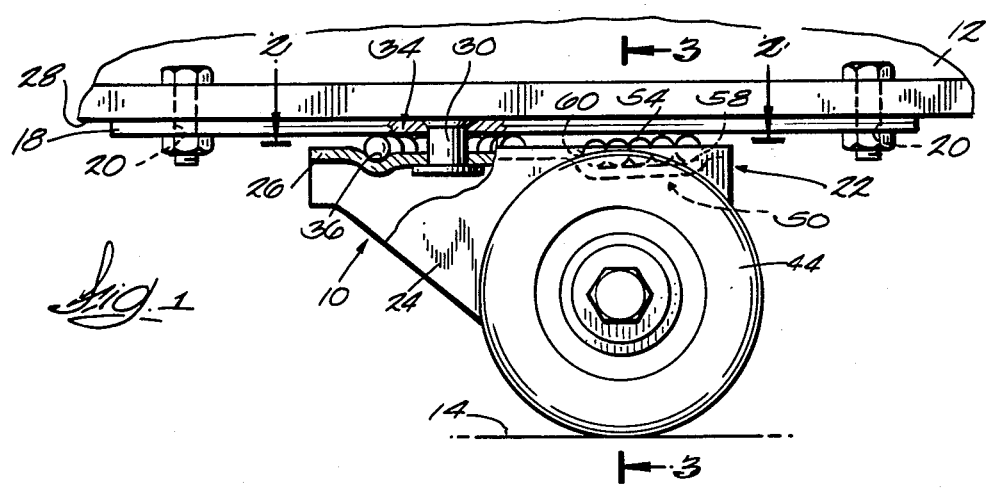
FIG. 1 is an elevation view partially in section and illustrating a caster embodying the present invention.

Before describing at least one of the embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF A PREFERRED EMBODIMENT

Illustrated in FIG. 1 is a caster 10 for use in supporting a structure 12 for movement along a surface 14. While a caster embodying the invention can have various constructions, in the illustrated arrangement it includes a plate 18 adapted to support the structure 12. In the particular construction illustrated, the plate 18 is provided with bores 20 to permit the supported structure 12 to be bolted to the support plate 18.

The caster 10 also includes a yoke 22 pivotably attached to the lower surface of the support plate and intended to be freely pivotable with respect to the support plate 18 about a vertical axis. More particularly, the yoke 22 includes a pair of spaced apart, parallel, downwardly extending planar legs 24, the legs 24 joined at their upper ends by a transverse horizontal web or plate member 26. The horizontal plate member 26 is positioned closely adjacent the lower surface 28 of the support plate 18, and means are further provided for pivotally joining the horizontal plate member 26 and the support plate 18 for pivotal movement with respect to each other about a vertical axis, i.e. an axis perpendicular to the plates 18 and 26 and extending through central portions of the plates. While this means for pivotally joining the yoke 22 to the support plate 18 could have various constructions, in the illustrated arrangement it comprises a rivet 30.

Bearing means are also provided surrounding the rivet 30 and supporting the horizontal plate 26 of the yoke 22 away from the lower surface 28 of the support plate 18 to provide for free rotation of the yoke 22 about a vertical axis. This means comprises a ball bearing assembly 34 including a circular bearing race 36 integrally formed in the upper surface of the horizontal plate member 26 of the yoke 22 and surrounding the axis of the rivet 30. The bearing race 36 houses a plurality of ball bearings 38.

Figure 3:
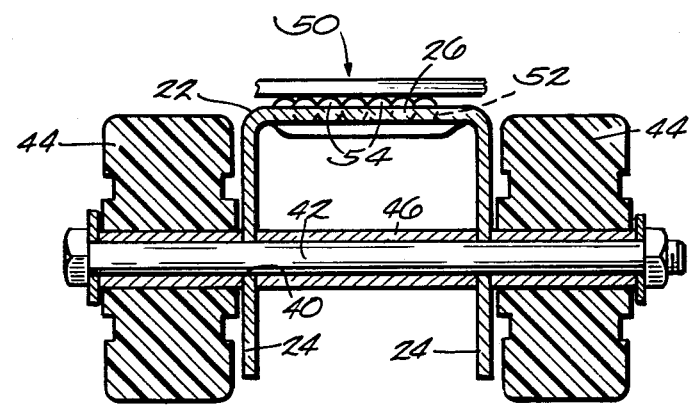
FIG. 3 is a cross section view taken along line 3—3 in FIG. 1.

The lower ends of the legs 24 include aligned bores 40 (FIG. 3) adapted to house an axle 42. The axle 42 is intended to support at least one wheel 44. In the particular construction illustrated, wheels 44 are rotatably mounted on opposite ends of the axle 42. A sleeve 46 surrounds the axle 42 and is positioned between the arms 24 of the yoke 22 to maintain the arms in properly spaced apart relation. It will be understood by those skilled in the art that in other arrangements, a wheel or wheels could be positioned between the arms 24 of the yoke.

Figure 2:
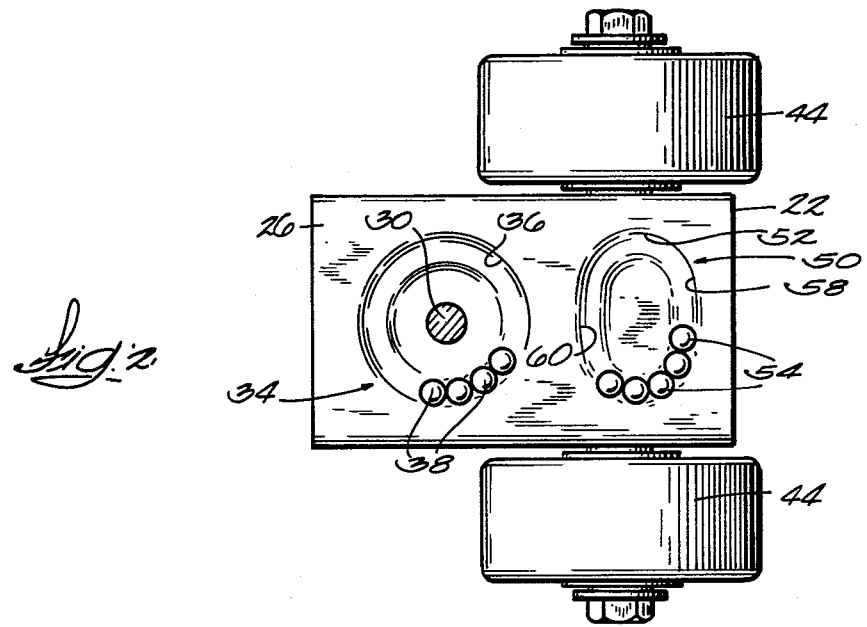
FIG. 2 is a cross section view taken along line 2—2 in FIG. 1.

A second ball bearing assembly 50, remote or spaced from the first bearing assembly 34, is further provided for supporting that portion of the support plate 18 positioned above the axle 42 and for transmitting force from the support plate directly to the axle and to the wheels 44 of the caster. The second ball bearing assembly 50 includes a second ball bearing race 52 formed in the upper surface of the horizontal plate 26 of the yoke 22 and above the axle 42, the second ball bearing race 52 being spaced from the first ball bearing race 36. The ball bearing race 52 houses a pluraliy of balls 54 adapted to support the support plate 18. As best seen in FIG. 2, the bearing race 52 includes a first race portion 58 which is arcuate and which forms an arc having a radius of curvature equal to the distance between that race portion and the vertical longitudinal axis of the rivet 30. The bearing race 52 also includes a second or return race portion 60, the return race portion 60 being comprised of a curved groove in the surface of the horizontal plate, that groove being somewhat deeper than that forming the first race portion 58 such that the balls 54 housed in the return race portion 60 do not engage the lower surface of the support plate.

In operation of the caster 10 and wherein a load is placed on the support plate 18, a substantial majority of that load is transferred from the support plate to the axle 42 and to the wheels 44 through the balls 54 in the first race portion 58 of bearing assembly 50. Since that race portion 58 defines an arc about the vertical axis of the rivet 30, the yoke is freely rotatable about that vertical axis.

Various features of the invention are set forth in the following claims.

I claim:
1. A caster including
a support plate member having a lower surface,
a yoke adapted to support said support plate, said yoke including
a pair of spaced apart downwardly extending legs, said legs including upper ends and lower ends, said lower ends having aligned bores,
a horizontal plate member joining the upper ends of said legs, said plate member having an upper surface in closely adjacent generally parallel spaced relation with respect to said lower surface of said support plate,
means for pivotably joining said plate member to said support plate for free rotation about a generally vertical axis,
an axle supported in said aligned bore, said axle being spaced laterally from said generally vertical axis such that said means for pivotally joining said plate member to said support plate is positioned laterally of said axle,
at least one wheel rotatably supported on said axle,
a first ball bearing assembly surrounding said means for pivotably joining, said first ball bearing assembly including a bearing race formed in one of said lower surface of said support plate and said upper surface of said horizontal plate member, said bearing race surrounding said generally vertical axis, and a plurality of balls housed in said race, and
a second ball bearing assembly including a bearing race spaced laterally from said first ball bearing assembly bearing race such that said first ball bearing assembly bearing race is positioned outside of said second ball bearing assembly bearing race, said second ball bearing assembly bearing race being formed in one of said lower surface of said support plate and said upper surface of said horizontal plate member and having a first race portion spaced laterally from said first ball bearing assembly and being positioned above said axle, said first race portion being arcuate and having as a center of curvature said generally vertical axis, and said first race portion housing a plurality of balls for transferring weight from said support plate to said yoke, to said axle, and to said wheel.

2. A caster as set forth in claim 1 wherein a majority of the weight on said support plate is transferred to said wheel by said second ball bearing assembly.

3. A caster as set forth in claim 1 wherein said second ball bearing assembly bearing race includes a first race portion supporting said balls against said lower surface of said support plate and a second return race portion wherein said balls are spaced from said lower surface of said support plate.

4. A caster as set forth in claim 1 wherein said second ball bearing assembly bearing race is generally oval.

5. A caster as set forth in claim 1 wherein said second ball bearing assembly bearing race includes a second race prtion diametrically opposed to said first race portion, both of said first and second bearing race portions being positioned in laterally spaced relation to said generally vertical axis and being positioned above said wheel.

* * * * *

UNITED STATES PATENT AND TRADEMARK OFFICE
CERTIFICATE OF CORRECTION

PATENT NO. : 4,447,932
DATED : May 15, 1984
INVENTOR(S) : Ralph W. Mueller

It is certified that error appears in the above-identified patent and that said Letters Patent is hereby corrected as shown below:

Column 4, line 4, the word "bore" should read -- bores --.

Column 4, line 46, the word "prtion" should read -- portion --.

Signed and Sealed this

Fourth Day of September 1984

[SEAL]

Attest:

GERALD J. MOSSINGHOFF

*Attesting Officer*     *Commissioner of Patents and Trademarks*